United States Patent
Ziaimehr et al.

(10) Patent No.: US 6,541,740 B2
(45) Date of Patent: Apr. 1, 2003

(54) HEATER/BLOWER UNIT WITH LOAD CONTROL

(75) Inventors: Allen Hamid Ziaimehr, Arden Hills, MN (US); Albert Philip Van Duren, Chaska, MN (US); Peter Donald Fraley, Brooklyn Park, MN (US)

(73) Assignee: Augustine Medical, Inc., Eden Prairie, MN (US)

( * ) Notice: Subject to any disclaimer, the term of this patent is extended or adjusted under 35 U.S.C. 154(b) by 3 days.

(21) Appl. No.: 09/970,523

(22) Filed: Oct. 3, 2001

(65) Prior Publication Data

US 2002/0030048 A1 Mar. 14, 2002

Related U.S. Application Data

(63) Continuation of application No. 09/484,681, filed on Jan. 18, 2000, now Pat. No. 6,355,915.

(51) Int. Cl.[7] .................................................. H05B 1/02
(52) U.S. Cl. ...................... 219/486; 219/492; 219/497; 219/483
(58) Field of Search ................................. 219/483–486, 219/481, 412–414, 492, 505, 497; 99/325, 330, 331, 334

(56) References Cited

U.S. PATENT DOCUMENTS

| | | | |
|---|---|---|---|
| 3,932,729 A | 1/1976 | Schlangen | 219/486 |
| 4,238,669 A * | 12/1980 | Huntley | 219/405 |
| 4,383,201 A | 5/1983 | Brandon | 315/78 |
| 4,559,441 A | 12/1985 | Rudich, Jr. et al. | |
| 5,465,573 A | 11/1995 | Abe et al. | 60/274 |
| 5,534,678 A * | 7/1996 | Bowles et al. | 219/396 |
| 5,550,463 A | 8/1996 | Coveley | 323/300 |
| 5,968,393 A * | 10/1999 | Demaline | 219/492 |
| 6,058,245 A * | 5/2000 | McNamara, Jr. | 392/308 |

FOREIGN PATENT DOCUMENTS

| | | |
|---|---|---|
| GB | 2 067 857 A | 7/1981 |
| GB | 2 117 194 A | 10/1983 |
| GB | 2 310 963 A | 9/1997 |

OTHER PUBLICATIONS

European Patent Office Search Report for App. No. GB 0018568.6.

* cited by examiner

*Primary Examiner*—Mark Paschall
(74) *Attorney, Agent, or Firm*—Gray Cary Ware & Friedenrich; Terrance A. Meador

(57) ABSTRACT

A substantially constant load impedance electrical heater has been provided. The heater is comprised of two sections, a first heater and a second heater. The first heater is continuously "on" to provide the bulk of the heat. A second heater is selectively engaged to provide slightly more heat to the medium, heating the medium to the desired temperature. The output temperature of the heated medium is maintained by controlling the duty cycle of the second heater. More drastic changes in temperature are accomplished by changing the power continuously dissipated by the first heater. The greatest heating control is obtained by defining the first and second heaters as subsets from a bank of selectable heater elements. A method of minimizing fluctuations in the loading of a high-wattage electrical device is also provided.

5 Claims, 12 Drawing Sheets

HEATER/BLOWER UNIT WITH LOAD CONTROL

CROSS REFERENCE TO RELATED APPLICATIONS

This application is a continuation of U.S. patent application Ser. No. 09/484,681, filed Jan. 18, 2000 now U.S. Pat. No. 6,355,915 entitled HEATER/BLOWER UNIT WITH LOAD CONTROL, which is incorporated herein by reference.

BACKGROUND OF THE INVENTION

This invention relates generally to forced-air convection heaters and, more particularly, to a high-wattage electrical device where load variations in the powering of the device are minimized to prevent light flicker.

The electrically loading of a high-power device often results in an instantaneous voltage droop in the associated power supply. For example, when the lights momentary dim as a refrigerator turns on. These instantaneous load changes can even cause power surges which blow fuses or harm other electrical equipment on the power line. When the loading of the mains supply by a high-power electrical device changes rapidly, a noticeable flicker in the electrical lighting can occur.

A variety of consumer electronics products produce large voltage fluctuations which, at the very least are annoying and, often times disruptive to computer equipment and monitors. Some of these high-wattage electric heating devices include clothes irons, electric frying pans, skillets, woks, fondue pots, waffle irons, toasters, hair dryers, portable heaters, and electric blankets.

The disruptive effect of high-wattage electrical devices is more of a concern in medical settings. Electrical forced-air heaters are often used in keeping patients warm during an operation. However, doctors have been known to have the heaters turned off, to avoid the obnoxious effect of light flicker.

A typical forced-air warming unit consists of a blower, heater, and a temperature controller. The temperature controller moderates the power supplied to the heater so that the bulk temperature of the air exiting the warming unit, or at some other control point, is maintained at a fixed, set-point value. In general, the warming unit's heater is sized so that its power dissipation is much greater than required to maintain a given air temperature. The large power dissipation permits the heater to meet steady-state thermal requirements within a wide range of ambient temperatures. Further, the time required to achieve the set-point temperature is minimized.

Several strategies are available for regulating the power supplied to the heater, and one of the most common is known as pulse-width modulation. Pulse-width modulation works by supplying the full supply voltage to the heater as a square wave. The duty cycle (the ratio of the on-time to the complete period) is varied by the controller so that the power supplied to the heater, averaged over time, maintains the set-point temperature.

One problem associated with the pulse-width modulation technique is the potential for extremely severe, periodic power mains loading, which occur with every transition to an "on" cycle by the controller. In a typical warming unit, the entire heater load (approximately 0.8–1.2 kW) is switched on and off at a duty cycle which is proportional to the product of mass airflow and the required temperature difference. Switching a load of this magnitude causes a large inrush of current to flow in the power mains. Because of the power line impedance, the voltage on the power mains drops when these large current inrushes occur. This voltage drop can cause a perceptible flicker in any light connected to the same mains as the warming unit.

Several techniques are known which may be used to minimize the flicker. However, these methods all have certain drawbacks which make them unsuitable in some respect.

One technique involves reducing the switching frequency below 0.2 Hz (one transition every 5 seconds, or longer). This switching frequency appears to be a threshold below which most people do not perceive flicker. However, since the switching period is very long, it is not possible to maintain the air temperature of the warming unit within an acceptable range.

Another technique involves switching power to the heater load at a rate equal to the line frequency. This technique requires specialized circuitry which synchronizes the switching rate to that of the applied line frequency, typically between 50 and 60 Hz. This method is very effective at eliminating flicker. However, because of the relatively rapid current transition rate, this technique also generates a large amount of electromagnetic emissions which must be suppressed with expensive and massive filtering circuitry.

It would be advantageous if a high-wattage heating device could be developed that would minimize load fluctuations upon the power supply.

It would be advantageous if forced-air heating units could be developed which did not produce a noticeable flicker in the lighting. It would be advantageous if this heater were available for use in hospital settings.

It would be advantageous if a "flicker-free" heater could be developed that was capable of operating over a wide temperature range, and also capable of rapidly responding to the selection of a new set-point temperature, or a change in input temperature.

SUMMARY OF THE INVENTION

Accordingly, a convection heater is provided having a substantially constant load to minimize light flicker. The heater is comprised of two basic sections, a roughing (first) heater and a finishing (second) heater. The first heater uses and dissipates most of the power, continuously heating the air to a first temperature which is close to the desired output temperature. The second heater variably heats the air. The combination of the first and second heaters raises the air temperature from the first temperature to the desired temperature. In this manner, the changes in the heater loading remain relatively small.

Typically, the power dissipated by the first heater is at least twice as great as the second heater. However, the critical feature is that the peak power of the second heater is minimized, for example, to a peak power of less than 200 watts. The variable loading of such low-power element produces no noticeable light flicker.

In the simplest aspect of the invention, the first heater is a single element and the second heater is a single element. In some aspects of the invention the first heater is multi-tapped. Upon determination of the desired output temperature, the first heater stage is selected which closely approaches, but does not exceed, the set-point. The second heater is then used to make up the difference between the heat supplied by the first heater and the desired output temperature. In some aspects of the invention, the first heater stages are dynamically varied to more quickly approach the target temperature, and the minimize the difference in heat that must be applied by the second heater.

In one aspect of the invention, the first and second heaters are both comprised of a plurality of heater sections. That is, the first heater is a first combination of heater sections selected from the plurality of heater sections, and the second heater is a second combination. Each of the plurality of heater sections dissipates a different peak power level, where the difference is graduated in steps of less than approximately 200 watts. Depending on the desired operating temperature and ambient conditions, the heater controller selectively activates each of the heater elements. A first peak power is generated by the first heater throughout a timed cycle, and a second peak power level intermittently occurs during the cycle. The first and second power levels are dynamic, so that the absolute values of the first and second peak powers may change with every cycle.

A method for regulating the loading of a high-wattage power device is also provided. The method comprising:

continuously dissipating a first peak power into a medium; and periodically dissipating an additional peak power into the medium.

The additional peak power is selected to be small. As a result of dissipating the first peak power, an output temperature is generated that is approximately the desired medium temperature. As a result of periodically adding an additional peak power, the desired temperature is generated.

DETAILED DESCRIPTION OF THE PREFERRED EMBODIMENT

Figure 1A:
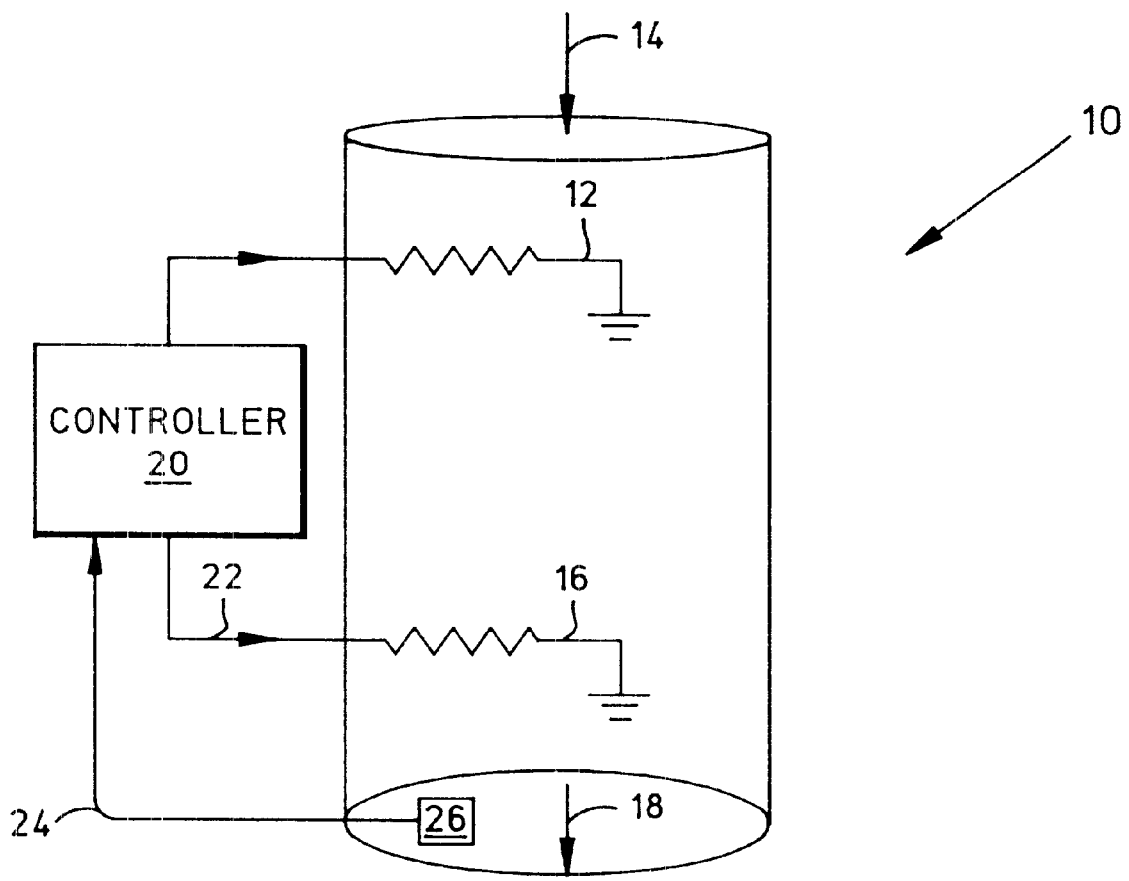
FIGS. 1a and 1b are diagrams illustrating the two-element aspect of the present invention convection heater, having light flicker suppression characteristics.
Figure 1B:
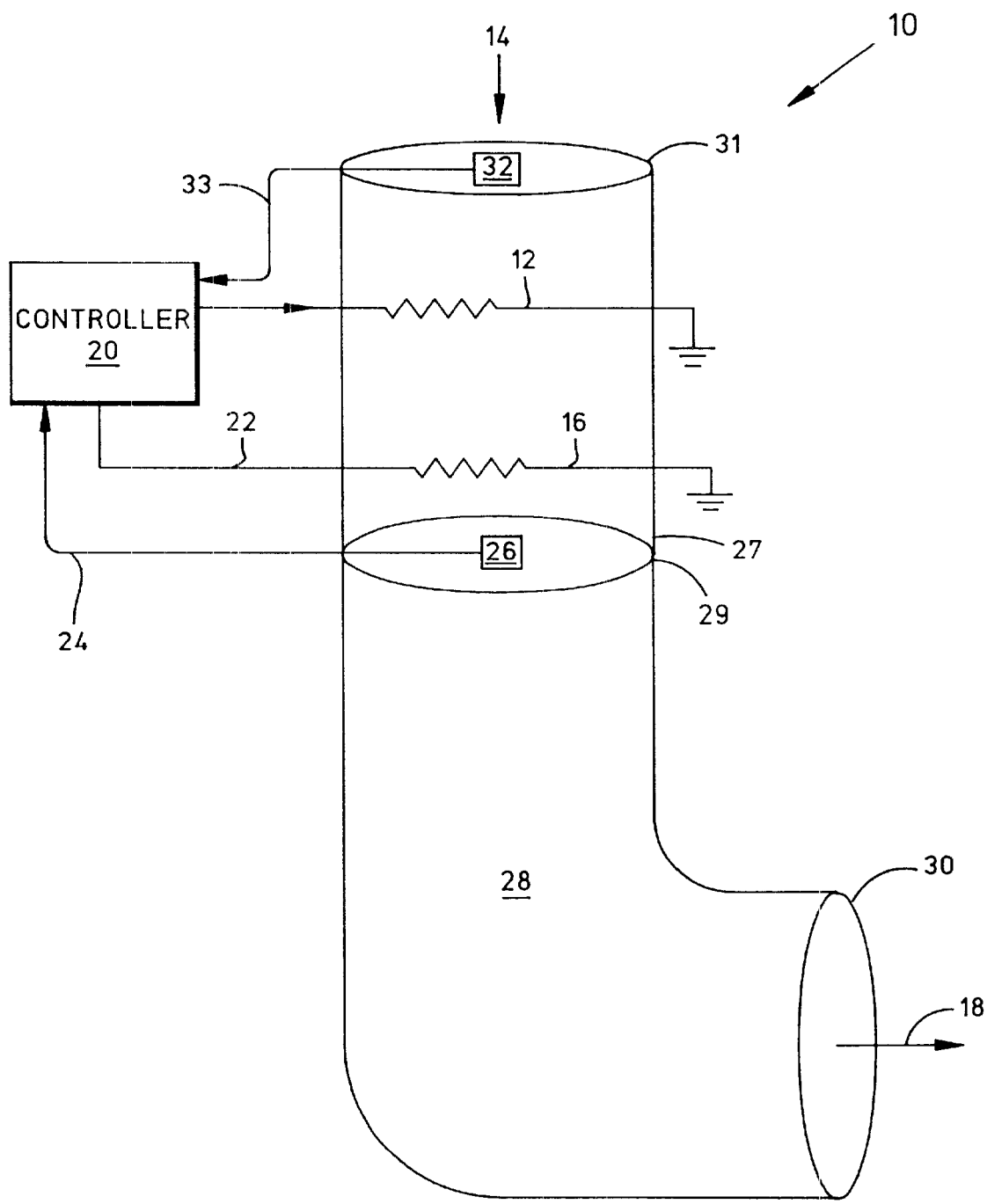

FIGS. 1a and 1b are diagrams illustrating the two-element aspect of the present invention convection heater, having light flicker suppression characteristics. In FIG. 1a, a heater 10 comprises a first heater 12, to continuously heat a medium to a first temperature. The entry of the unheated medium into heater 10 is represented by the arrow labeled with reference designator 14. A second heater 16 intermittently heats the medium, in combination with the first heater 12, to a second temperature, greater than the first temperature. The passage of the medium at the second temperature, from the heater 10, is represented by the arrow labeled as reference designator 18.

The invention is basically realized by placing at least two independent heaters within the same airflow, medium, or fluid stream. The first heater, referred to as the roughing heater 12, operates continuously, and is sized so as to provide enough power to raise the temperature of the input medium stream 14 to within a few degrees of a desired set-point value. The second heater, referred to as the finishing heater 16, is a relatively low-power heater. During normal operation, both heaters 12 and 16 are activated, but only the power of second heater 16 is modulated to maintain the desired medium outlet temperature.

The first heater 12 dissipates a first peak power. The combination of the first heater 12 and the second heater 16 dissipates a second peak power, greater than the first peak power. The second heater 16 dissipates a third peak power, which is the difference between the first and second peak powers. As the power consumed by the second heater 16 is relatively small, the periodic loading of the power mains, as well as the attendant voltage drop, is minimized. In some aspects of the invention the first heater 12 can dissipate twice, three times, or even more, power than the second heater 16. More critical, however, is the fact that the second heater 16 dissipates less than approximately 200 watts of peak power. In some aspects of the invention, the second heater dissipates less than approximately 130 watts of peak power. In a typical aspect of the invention heater 10 is binary; binary because there are only two heating elements, and because the first element 12 is twice the peak power level of second element 16.

A controller 20 has an output on line 22 to provide temperature control commands. The second heater 16 has an input on line 24 connected to the controller 20. The second heater 16 varies the intermittent dissipation of power in response to commands from the controller 20.

The controller 20 has an input on line 24 to receive temperature information. A first temperature sensor 26 measures the second temperature 18 at the output 27 of heater 10. The second temperature is typically the heater output temperature, however, the second temperature may also represent the medium temperature at some other control point in the heater. The first temperature sensor 26 has an output on line 24, connected to the input of the controller 20, to provide second temperature information. The controller 20 provides temperature control commands on line 22 in response to the second temperature information. The second heater 16 varies the intermittent dissipation of power in response to temperature control commands from the controller 20.

In the context of the typical forced air warming (FAW) application, the heat demand remains nearly constant at steady-state conditions, so the second heater 16 is designed to supply a small fraction of the total required power. For example, an ambient temperature of 20° C. is assumed, with an output (second) temperature of 43° C. being desired. The FAW unit delivers air at a constant 30 ft$^3$/m (14.2 L/s). If, for simplicity, no extra heat losses are assumed, then the power required to raise the air temperature 23° C. is given by $$Q = \dot{m}c_p \Delta T$$

where $$\dot{m} = \left(1.12 \frac{kg}{m^3}\right)\left(14.2 \frac{L}{s}\right)\left(0.001 \frac{m^3}{L}\right) = 0.016 \frac{kg}{s}$$

and $$\dot{m}c_p = \left(0.016 \frac{kg}{s}\right)\left(1.008 \frac{kJ}{kg-K}\right) = 0.016 \frac{kJ}{s-K}$$

so $$Q = \left(0.016 \frac{kJ}{s-K}\right)(23K) = 0.368 \frac{kJ}{s} = 368W$$

The first heater 12 can be sized to supply 320W (87% of the total) and the second heater 16 to supply 100W (114% of total in combination). In this case, the first heater 12 would raise the air temperature 20.0K (°C.) to 40° C., and the smaller heater 16 would have to make up the difference. In practice, the heat losses are not insignificant and both heaters would probably be larger than computed here to meet the full range of air flow, ambient temperature and line voltage input conditions, and there is inevitably some trade-off between performance and flicker suppression. To meet the full range of temperatures, the first heater 12 must be sized to meet the restraints imposed by maximum voltage, ambient air temperature, and low air flow, and yet have enough power to control the temperature at low voltage input, low ambient temperature, and high air flow. If a higher power second heater is required, the flicker suppression characteristics of the heater may be degraded. More sophisticated embodiments of the present invention, presented below, address this problem.

The peak power dissipated by the heaters 12 and 16 varies with respect to the application. In general, no more than about 200 W is switched to avoid a perceptible flicker. In a typical FAW unit, the input power requirement is about 500–600 W at steady-state conditions. If the first heater 12 is 500 W, then its current is I=P/E=500/120=4.2 A. Its resistance at 120 VAC is R=E/I=120/4.2=28.5 ohms. Because of line impedance, a value of 35 ohms is often used. The second heater's 16 values are approximately 150W and 96 ohms. The average power, as stated above, is about 600 Watts for an average environment. The peak power may go as high as 1000 Watts for a properly sized heater combination.

Figure 2:
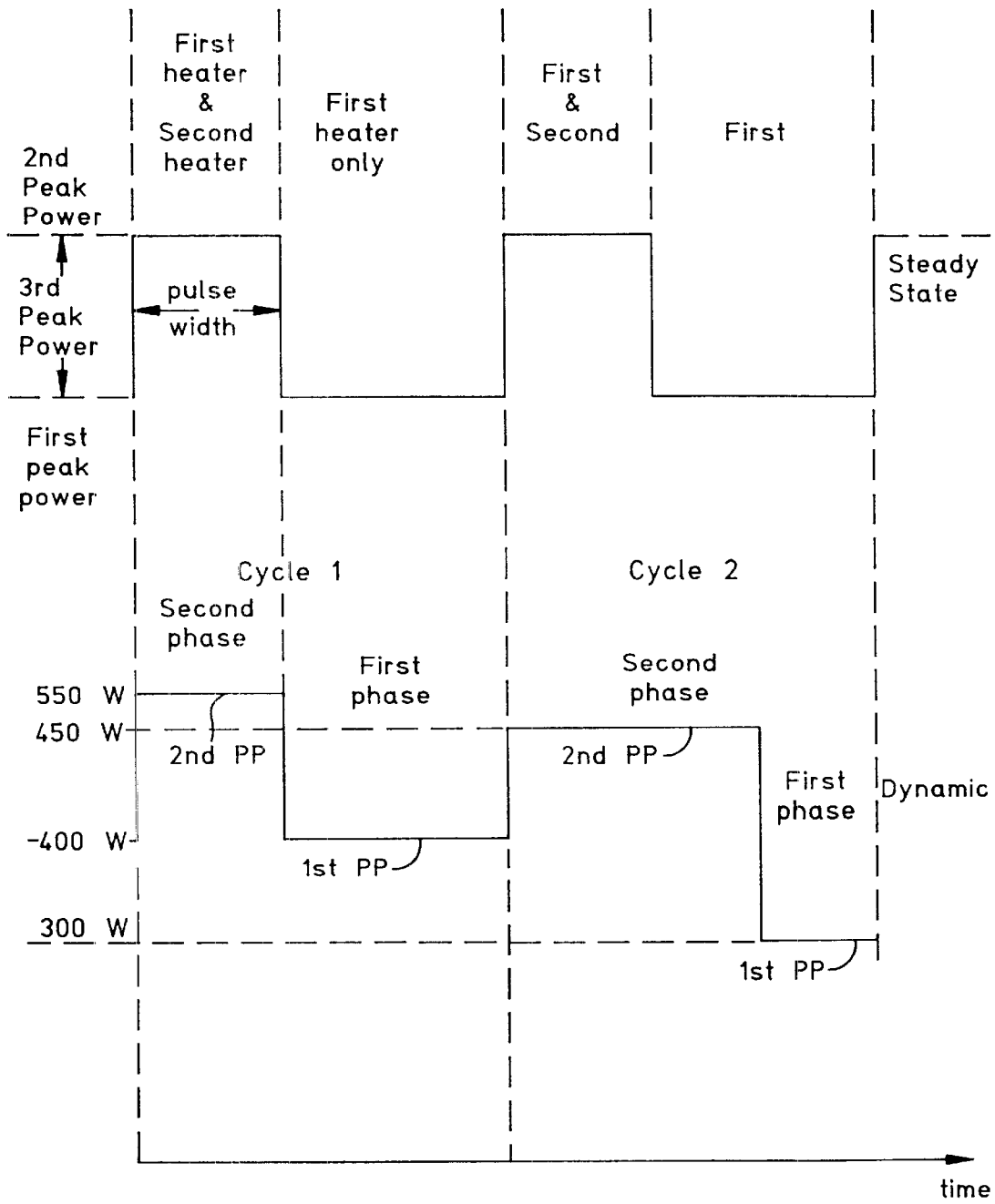
FIG. 2 illustrates exemplary first duty cycle patterns used to control the enablement of the first and second heaters.

FIG. 2 illustrates exemplary first duty cycle patterns used to control the enablement of the first 12 and second 16 heaters. The controller 20 provides temperature commands on line 22 (see FIG. 1a), which correspond to a first duty cycle of width-modulated pattern of pulses. As shown in the "steady state" scenario, the second heater 16 is enabled by selectively connecting heater 16 to an electrical power source (not shown). Therefore, the second heater 16 dissipates power in response to the first duty cycle pulse-width modulation, and the second temperature 18 is responsive to the modulation of the pulse widths. It should be noted that the proportional time devoted to the engagement of the second heater 16 is approximately equal between cycles 1 and 2 in steady state, as shown. However, the division of the cycle between the first 12 and second 16 heaters may vary from cycle to cycle. That is, the width modulation may vary, as shown in the "dynamic" scenario.

In FIG. 1b a heater hose 28 is shown to deliver the heated medium 18. Hose 28 has a proximal end 29 attached to the output 27 of heater 10 and a distal end 30 to deliver the heated medium 18 to a target. In some aspects of the invention first temperature sensor 26 is located at the hose proximal end 29, as shown in FIG. 1b, to reduce complexities in the construction, use, and maintenance of hose 28. Then, heater 10 has an input 31 to accept the medium to be heated. The input temperature of the medium is defined as the third temperature. A second temperature sensor 32 measures the third temperature. The second temperature sensor 32 has an output on line 33 connected to the controller 20 to provide third temperature information. The controller 20 varies the temperature control commands on line 24 in response to the third temperature information, and second heater 16 varies the power dissipated in response to the temperature control commands from the controller 20. Alternately, first heat sensor 26 is mounted at the distal end 30 of hose 28 (not shown), and the second temperature sensor 32 is unnecessary. Although hose 28 is often used with heater 10, especially in medical applications, it is not shown in the following aspects of the present invention in the interest of clarity.

Figure 3:
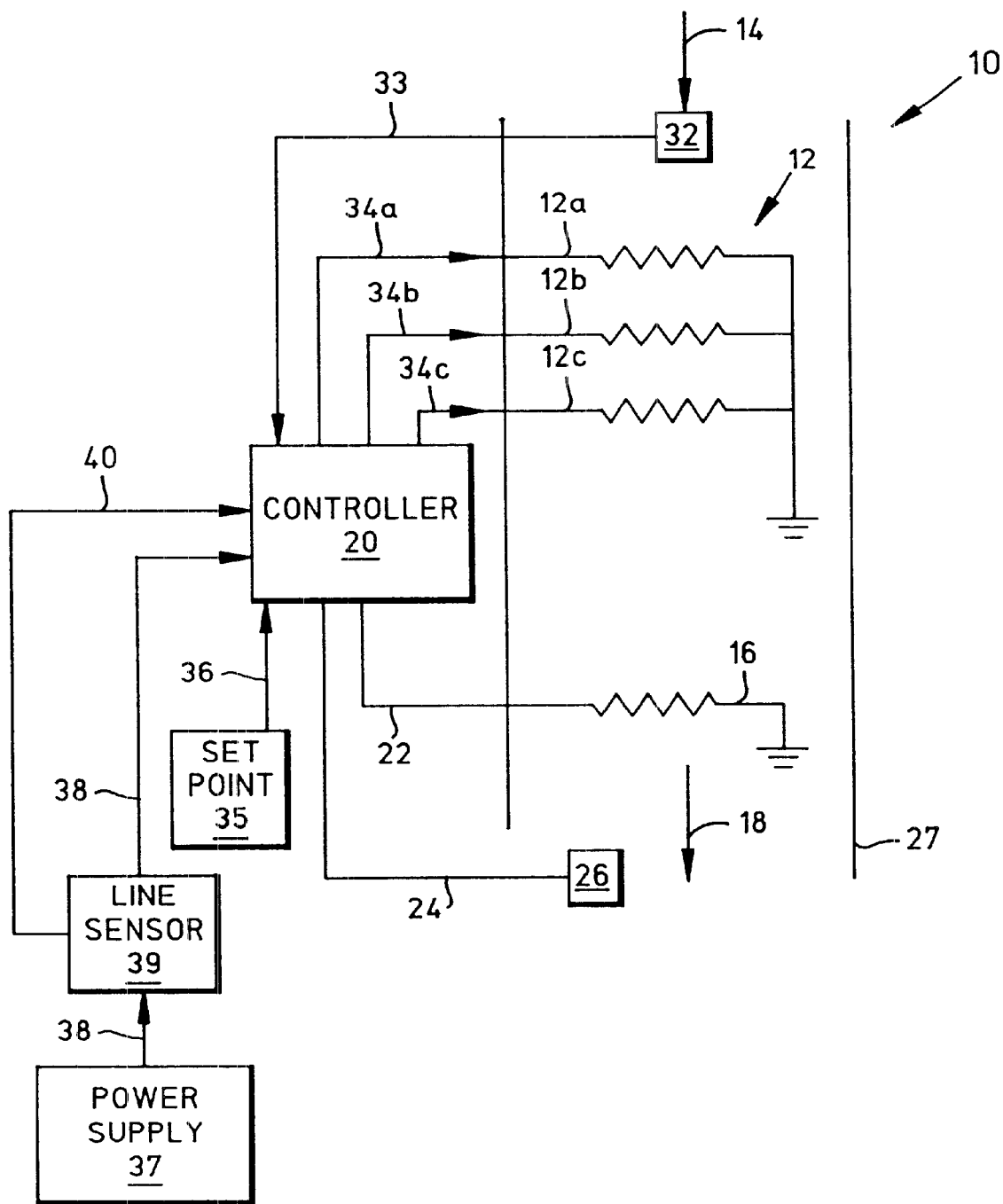
FIG. 3 is a block diagram schematic illustrating a multi-tapped first heater aspect of the invention.

FIG. 3 is a block diagram schematic illustrating a multi-tapped first heater 12 aspect of the invention. Since the warming unit must produce heated air at several discrete exhaust temperatures and operate within a fairly large range of ambient input temperatures, a single fixed-value first heater 12 is not always adequate. In some aspects of the invention, the first heater 12 includes a multitapped, multistage arrangement, or plurality of elements, represented by elements 12a, 12b, and 12c. The appropriate section (or sections) 12a, 12b, or 12c, is activated in response to the selection of a discrete set-point temperature. The resistance and power dissipated by element 12c is typically greater than the resistance of element 12b. Likewise, the resistance of element 12b is typically greater than heater element 12a. Alternately, the elements 21a, 12b, and 12c may all dissipate equal peak power levels, so that variations in the first peak power result from the engagement of multiple elements simultaneously.

The multitapped, or multistage, elements 12a, 12b, and 12c selectably provide a first peak power from a range of peak power values. The multitapped first heater 12 is represented herein with three sections 12a, 12b, and 12c, but the invention is not limited to any particular number of sections. In this aspect of the invention, the function of the second heater section 16 remains substantially the same as explained in the description of FIG. 1.

Alternately stated, the first heater 12 provides a selectable steady-state first peak power level responsive to elements 12a, 12b, and 12c. The first heater 12 has inputs on lines 34a, 34b, and 34c, corresponding respectively to elements 12a, 12b, and 12c, to receive first temperature selection commands to select the first peak power. The controller 20 has an output connected to the first heater 12 input on lines 34a, 34b, and 34c to provide temperature control commands. The first heater 12 dissipates a selected steady-state first peak power in response to temperature control commands from the controller 20.

The first heater sections 12a, 12b, and 12c are selectable by a mechanical or electrical switch. Alternately, the first heater sections (as shown) are switched by controller 20 through lines 34a, 34b, and 34c. In the simplest aspect of the invention the first heater element(s) remain constantly engaged, once selected. However, in other aspects of the invention the first heater elements 12a, 12b, and 12c are varied to optimally produce the desired medium output temperature with the minimum of light flicker. Then, the selection of the first heater sections 12a, 12b, and 12c is dynamic.

The highest power heater element is selected which will not heat the medium beyond the desired temperature, and the medium output temperature is monitored. As above, the first heater remains "on" for the duration of the operation, with a dynamic selection of the first heater element occurring at a relatively slow rate, for example, less than one change every 10 seconds. The first heater is responsive to commands from controller output lines 34a, 34b, and 34c which provide controller commands which vary the outputs with respect to time. The second heater 16 is still controlled by line 22, as described above, to achieve the desired set-point temperature. Alternately stated, the first heater is always on, producing a constant first peak power level. However, the first heater (first peak power level) is allowed to vary once a cycle, with the second heater intermittently being engaged inside that cycle.

A set-point, or desired, temperature is selected by set-point mechanism 35, connected to the controller 20 on line 36 to supply temperature information used in controlling the second temperature. This scheme allows the second heater 16, and thus, the amount of power switched by the controller 20 into second heater 16, to remain relatively constant and small regardless of the desired outlet temperature 18.

In one aspect of the invention the controller 20 uses a calculation of the derivative of the second temperature information to provide temperature control commands, which select the proper first heater elements 12a, 12b, and 12c. Information derived from set-point mechanism 35 and first sensor 26 are used in this calculation.

Heater 10 also comprises an electrical power source 37 connected to the controller 20 on line 38. A line voltage sensor 39 measures the line voltage of the electrical power source 37 on line 38. The line voltage sensor 39 has an output on line 40 connected to an input of the controller 20 to provide voltage information.

The controller 20 provides temperature control commands on lines 34a, 34b, and 34c which selectively connect the electrical power source 37 to the heater sections 12a, 12b, and 12c, respectively. The heater sections 12a, 12b, and 12c dissipation of power is controlled in response to the temperature control commands.

The controller 20 provides temperature control commands generated by a proportional-integral-derivative (PID) formula responsive to temperature variables input to the controller 20. The temperature variables include the information from sensor 26 (medium output, or second temperature 18), the second sensor 32 (medium input, or third temperature 14), line voltage sensor 39, and the set-point temperature from mechanism 35. Heater sections 12a, 12b, and 12c vary the power dissipated in response to the temperature control commands from the controller 20.

There are several ways in which the algorithm is supplied with input information. One method involves using the line voltage, input temperature, and desired outlet temperature values to select the appropriate heater combinations. This method uses either a look-up table or a transfer function to accomplish its selection.

Another control algorithm selects the appropriate first and second heaters based on a determination the derivative of the outlet temperature. This method has a theoretical advantage over the first method in that it does not require the value of the input temperature as one of the input values.

Figure 4:
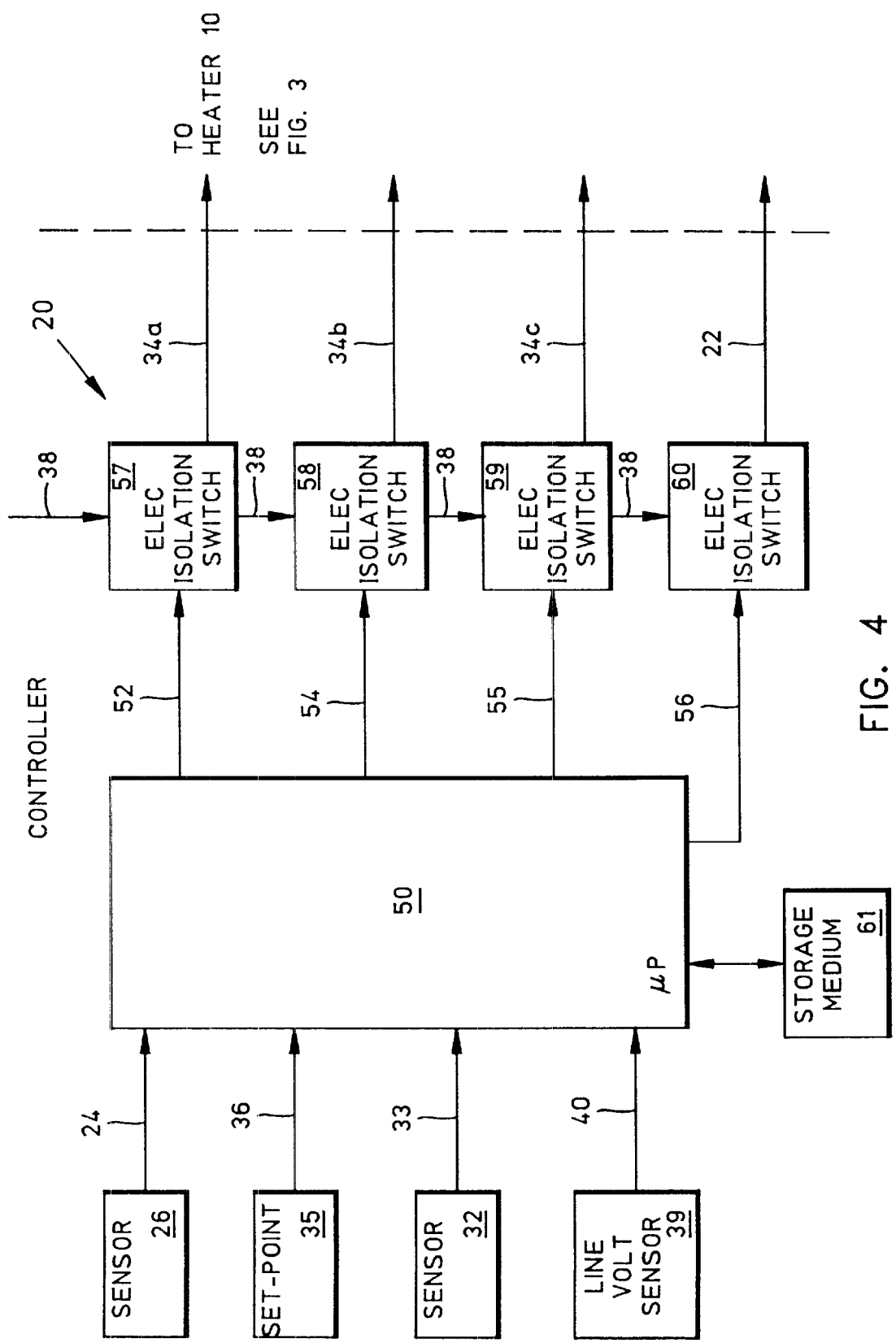
FIG. 4 is a block diagram schematic of a controller of the present invention.

FIG. 4 is a block diagram schematic of a controller of the present invention. The controller accepts inputs from sensors, such as first sensor 26, second sensor 32, line voltage sensor 39, and set-point mechanism 35. A microprocessor 50 evaluates the sensor input and outputs temperature control commands on lines 52, 54, 55, and 56. Power supply current enters controller 20 (or is otherwise controlled) from power source 37 on line 38. The power lines 38 are isolated with electrical isolators 57, 58, 59, and 60, or provided by isolated power supplies (not shown) in some aspects of the invention. The control of lines 34a, 34b, and 34c (to heater sections 12a, 12b, and 12c, respectively, see FIG. 3) is a result of signals on signal lines 52, 54, and 55, respectively. Likewise, second heater 16 is dynamically varied with respect to time in response to a control signal on line 56. In some aspects of the invention a storage medium 61 is in communication with microprocessor 50 to provide program instructions and control algorithms. Alternately, storage medium 61 is embedded in the microprocessor 50 (not shown).

Figure 5:
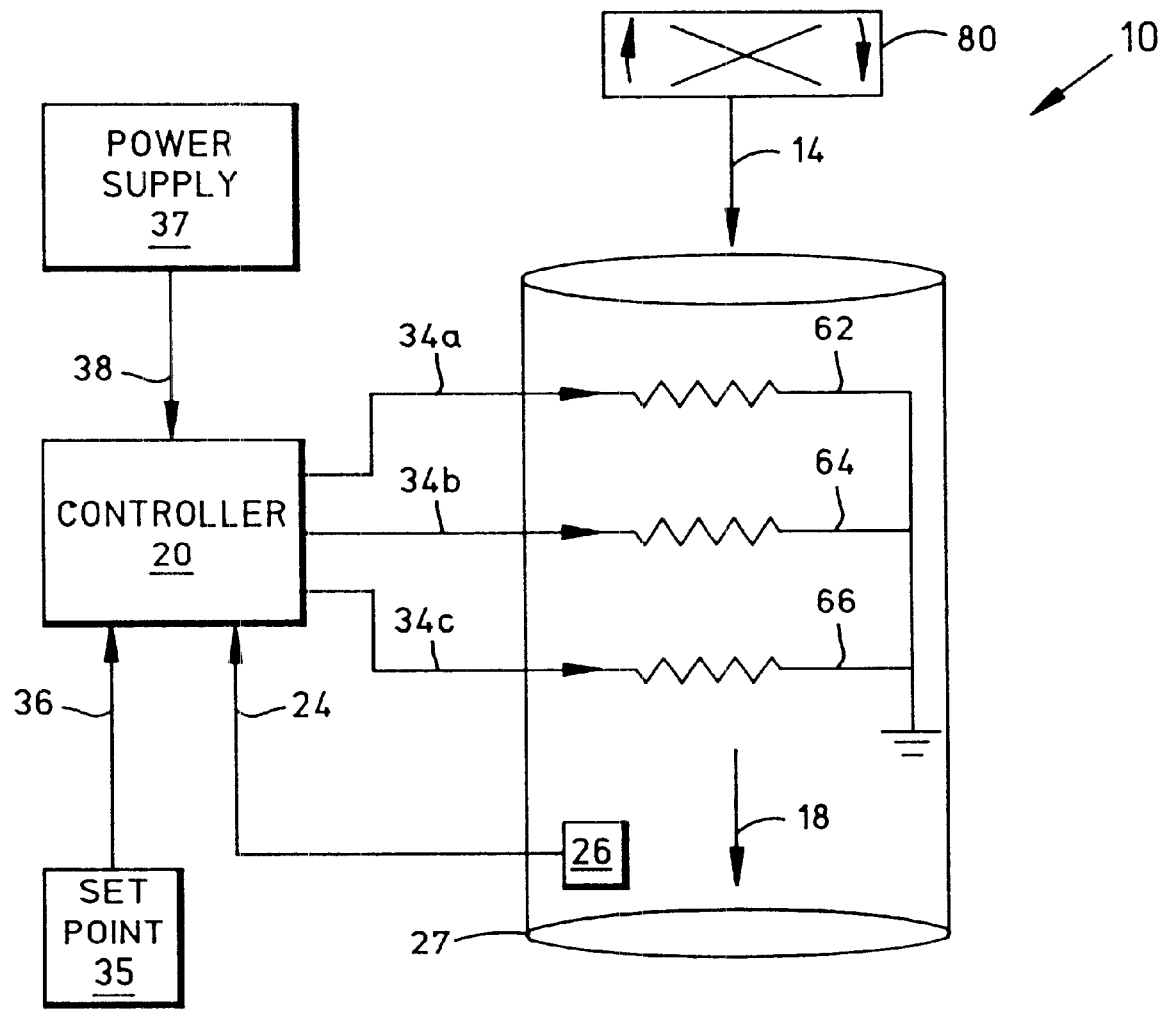
FIG. 5 illustrates a multistage aspect of the present invention heater.

FIG. 5 illustrates a multistage aspect of the present invention heater. A novel method of minimizing the number of heater stages in this invention is realized by employing at least a two stage (or more) heater. FIG. 5 depicts a three-stage heater 10. In its simplest from, an algorithm selects the largest possible load, or first combination of three available heaters, for the first heater. The algorithm then selects a second combination of the three heaters to act as the second heater. This embodiment now permits both the first and second heaters to be selectable to minimize loading changes. The preferred algorithm is any PID (Proportional Integral Derivative) loop algorithm.

A PID algorithm examines the temperature error from three perspectives. A proportional analysis examines the difference between the set-point temperature and the measured temperature. The result is a a determination of the fastest way of reaching the set-point temperature. An integral analysis examines the accumulation of error as equilibrium (the set-point temperature) is approached and achieved. It adds steady-state precision by counteracting low frequency error. A differential analysis examines the rate of change in the error. It counteracts the proportional calculation, to prevent overshoot, undershoot, and to dampen out ringing.

The invention of FIG. 5 is dynamic with respect to power levels and modulation timing. For the purpose of clarity, the invention is first presented with the assumption that the power levels of the first and second heaters sections remain constant. That is, the power level of the first and second heaters are not dynamic. However, as presented in detail below, the dynamic aspects of these heaters provide great utility.

Heater 10 comprises a plurality of selectably connectable heater elements 62, 64, and 66 controlled by lines 34a, 34b, and 34c. The operation of the controller 20 and the use of lines 34a, 34b, and 34c is similar to that described above in the explanation of FIGS. 3 and 4. Three sections 62, 64, and 66 are shown, but the present invention is not limited to any particular number of heater sections. Further, the heater sections are represented by resistive elements, but the concept of the present invention is applicable to many other high-wattage power consuming devices. The concept of the first and second heater becomes more conceptual in the more sophisticated control aspects of the invention. The heater 10 operates in a first phase, with a first combination of heater sections. A second phase, representing the addition of a second heater to the first heater, is represented by a second combination of heater sections. That is, the first phase heater is selected from the selectably connectable plurality of heater elements 62, 64, and 66. Likewise, the second phase heater, the combination of first and second heaters, is selected from the selectably connectable plurality of heater elements 62, 64, and 66. Typically, the difference in peak power between the first and second phase heater combinations is selected to be as small as possible, to minimize the change in loading.

The first heater element 62 dissipating a peak power, a second heater element 64 dissipating a peak power greater than that of the first heater element 62, a third heater element 66 dissipating a peak power into the medium, greater than that dissipated by the second heater element 64, and an option of selecting no heater (dissipating no peak power). Then, the first and second heaters are selected from the group consisting of the first 62, second 64, third 66 heater elements, and combinations of the first heater element 62, second heater element 64, third heater element 66, and no heater element. As above, the combination of second and first heaters dissipates a second peak power greater than the first peak power dissipated by the combination of first phase heaters. The difference between phases, with the enablement of the second heater, is a third peak power of less than approximately 200 watts.

For example, the first phase heater may consist of the first and second heater sections 62 and 64 to generate a first peak power. Turning on the second heater, in addition to the first heater, generates the second peak power (the second heater phase), and entails finding the next largest combination of heater sections. In this case, first and second heater sections 62 and 64 are turned off, and third heater section 66 is turned on to generate the second peak power.

Typically, the peak power of the third heater element 66 is approximately twice as great as the peak power of the second heater element 64. The peak power of the second heater element 64 is approximately twice as great as the peak power of the first heater element 62. This same relationship holds true when four, or more, heater sections are used.

For simplicity, the heater of FIG. 5 has been described as having first and second peak power values that remain constant, once chosen. However, the first and second peak power values may also vary dynamically. Alternately stated, the first and second combinations of the plurality of heater elements 62, 64, and 66 vary dynamically with respect to peak power and time. In the dynamic change scenario, the first peak power remains on continuously and the additional third peak power is intermittently added to the first peak power, as before. The third peak power level is less than 200 watts. But now the value of the first and third peak power levels may change every cycle. Returning briefly to FIG. 2 to discuss the "dynamic" scenario, cycle 1 begins with a second phase (first plus third peak power) and ends with a first phase (first peak power only). The second phase of cycle 2 may be at a different power level than that of cycle 1. That is, the first peak power may change.

For example, in cycle 1 the second peak power (first plus third peak powers) is 550 watts and the first peak power level is 400 watts. In cycle 2 the second peak power is 450 watts and the first peak power is 300 watts. The power changes from 550 watts, to 400 watts in cycle 1, and from 450 watts, to 300 watts in cycle 2. None of the changes in power are greater than 200 watts, including the changes between cycles. Note, the timing relationship between the second and first phases remain dynamic also, as the amount of "on" time of the second and first phases changes between cycle 1 and cycle 2.

As above, the controller 20 provides temperature control commands generated by a proportional-integral-derivative (PID) formula responsive to the controller inputs. The plurality of heater elements 62, 64, and 66 vary the power dissipated in response to the temperature control commands from the controller 20. The temperature control commands provided by the controller 20 include a two-part digital word. Each heater of the plurality of heaters 62, 64, and 66 is selected in response to a bit in the first part of the digital word, and the intermittent occurrence of the second peak power is responsive to the second part of the digital word. A more detailed example of a dynamically changing first/second phase heater is presented below in the description of FIG. 10.

Referring to FIG. 5, in many applications the medium to be heated is air, although the concept of the present invention is more far reaching. Then, a fan or blower 80 is provided. The blower 80 delivers air to the heater sections 62, 64, and 66.

Although one intent of the invention is to eliminate flicker within the operating room during the operation of a convective warming unit, the invention has much wider application. In particular, the basic invention could be used with any type of high-power electric heater, irrespective of heat transfer mode employed by the device. Other medical devices, such as fluid warmers, mattress-type circulating-fluid patient warmers, neonatal (over-the-bed) radiant warmers, and feet warmers (portable heaters) can also be made "flicker-free" with the present invention.

Figure 6:
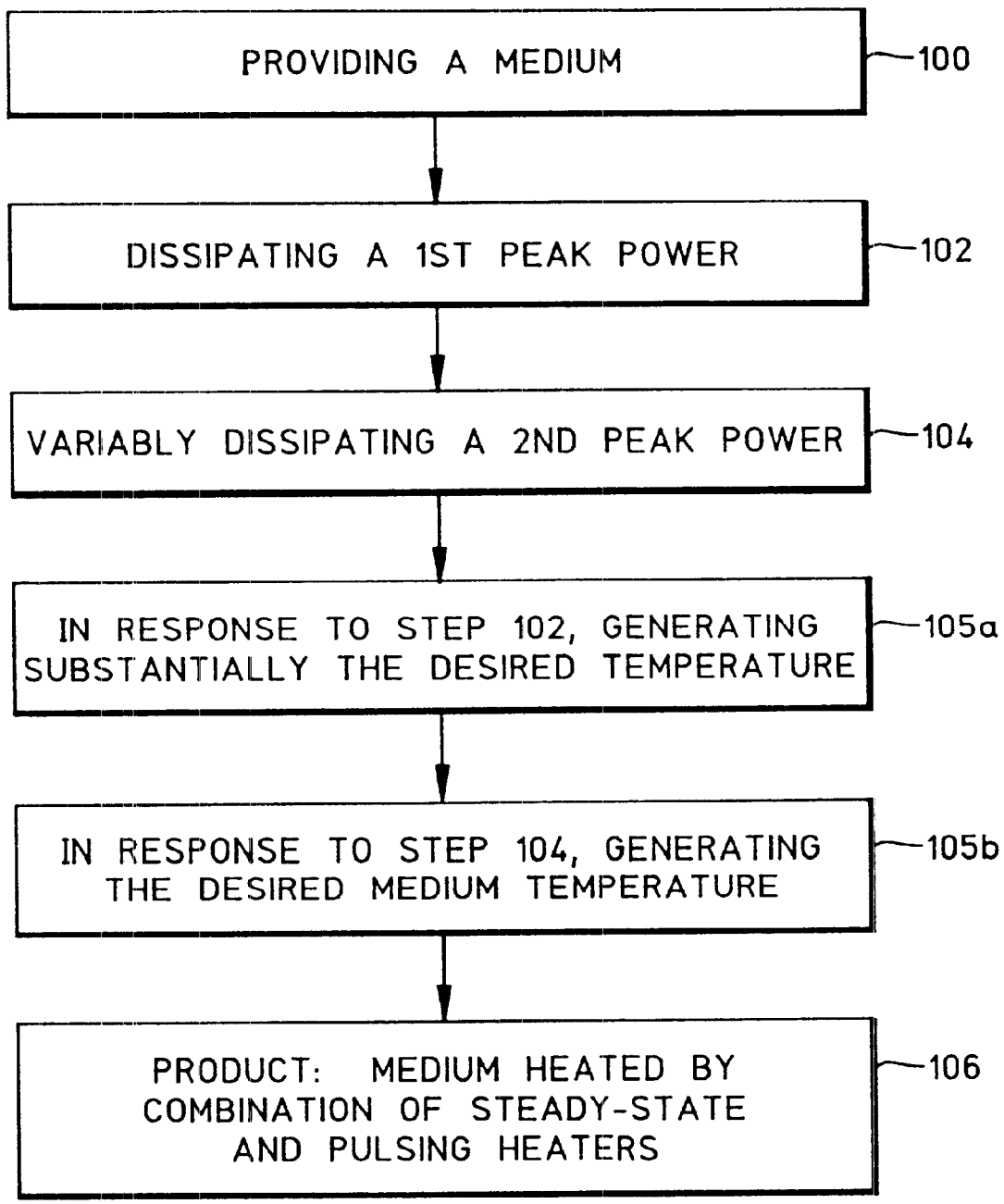
FIG. 6 is a flowchart illustrating a method for heating in accordance with the present invention.

FIG. 6 is a flowchart illustrating a method for heating in accordance with the present invention. Referring briefly to FIG. 4, this method can be enabled using a software program including a set of instructions hosted in storage medium 61, which are carried out by microprocessor 50. Although the steps are numbered for a clearer presentation of the process, no order should be inferred from the numbering unless explicitly stated. Step 100 provides a medium, such as air, to be heated. Step 102 continuously dissipates a first peak power into the medium. Step 104 intermittently dissipates an additional peak power, in combination with the first peak power, into the medium. Step 106 is a product, a medium heated by a combination of steady-state and pulsing heaters.

The most basic mechanism of temperature control is in the variation of the first duty cycle associated with the intermittent additional peak power. That is, Step 104 includes varying the intermittence of the additional peak power. However, since the process is designed to be used for a number of input and output temperatures, the peak power levels must typically vary, as well as the intermittent timing. Then, Step 102 includes selecting the first peak power from a plurality of peak power levels. Making the first peak power adjustable in Step 102, permits the power fluctuations associated with Step 104 to be minimized. The combination of the first peak power and the intermittent peak power is defined as the second peak power, and the intermittent peak power is defined as the third peak power level, and Step 104 includes selecting the second peak power so as to minimize the third peak power. Typically, Step 104 includes the third peak power being less than approximately 200 watts.

Some aspects of the invention comprise further steps. Step 105*a*, in response to Step 102, generates substantially a desired temperature in the medium. Step 105*b*, in response to Step 104, generates an output temperature that is the desired medium temperature.

Figure 7:
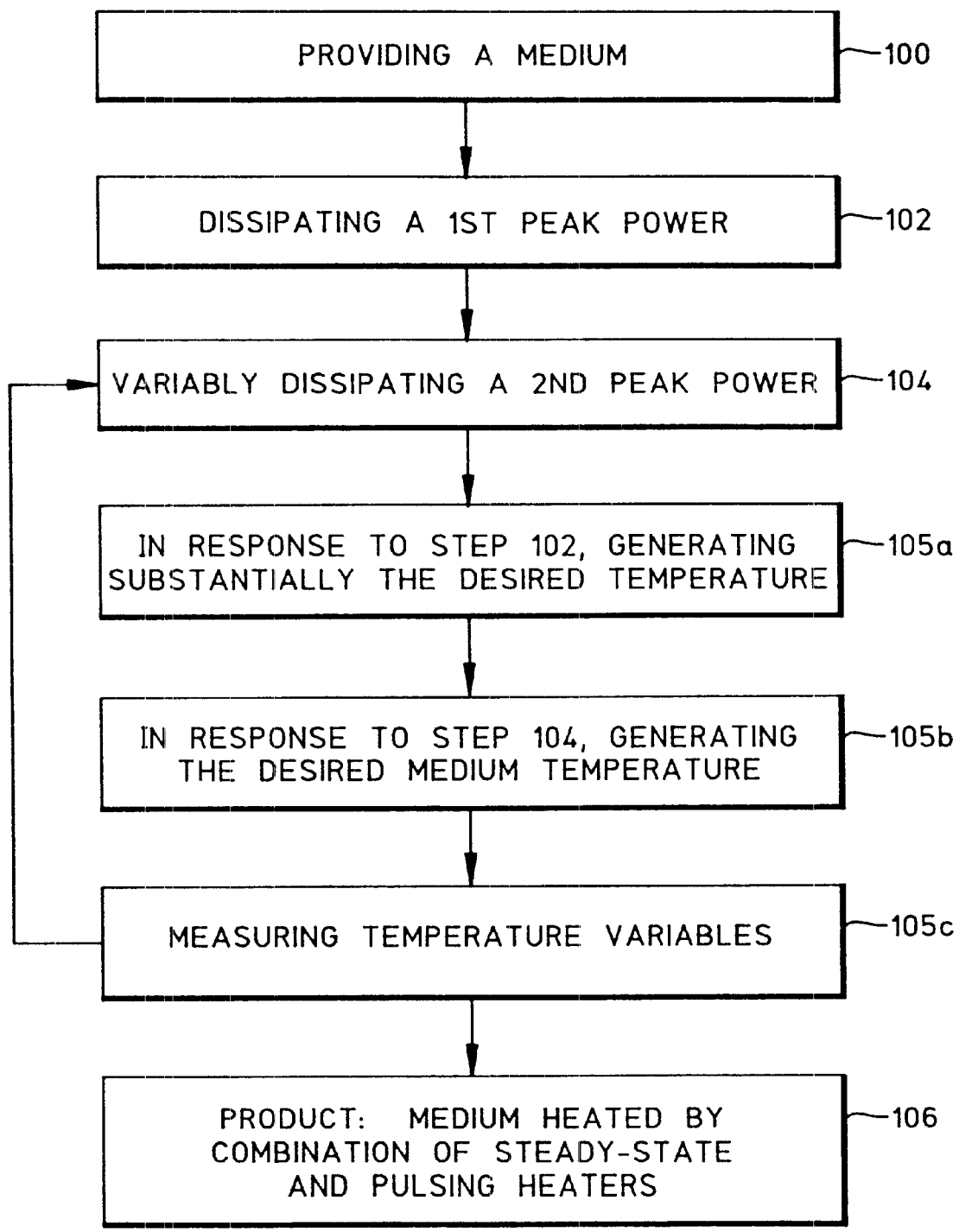
FIG. 7 illustrates a detailed aspect of the method described by FIG. 6.

FIG. 7 illustrates a detailed aspect of the method described by FIG. 6. A further step, Step 105*c*, measures temperature variables. Specifically, Step 105*c* measures the desired temperature over time. Step 104 includes varying the intermittence of the second peak power in response to the temperature measured in Step 105*c*.

Figure 8:
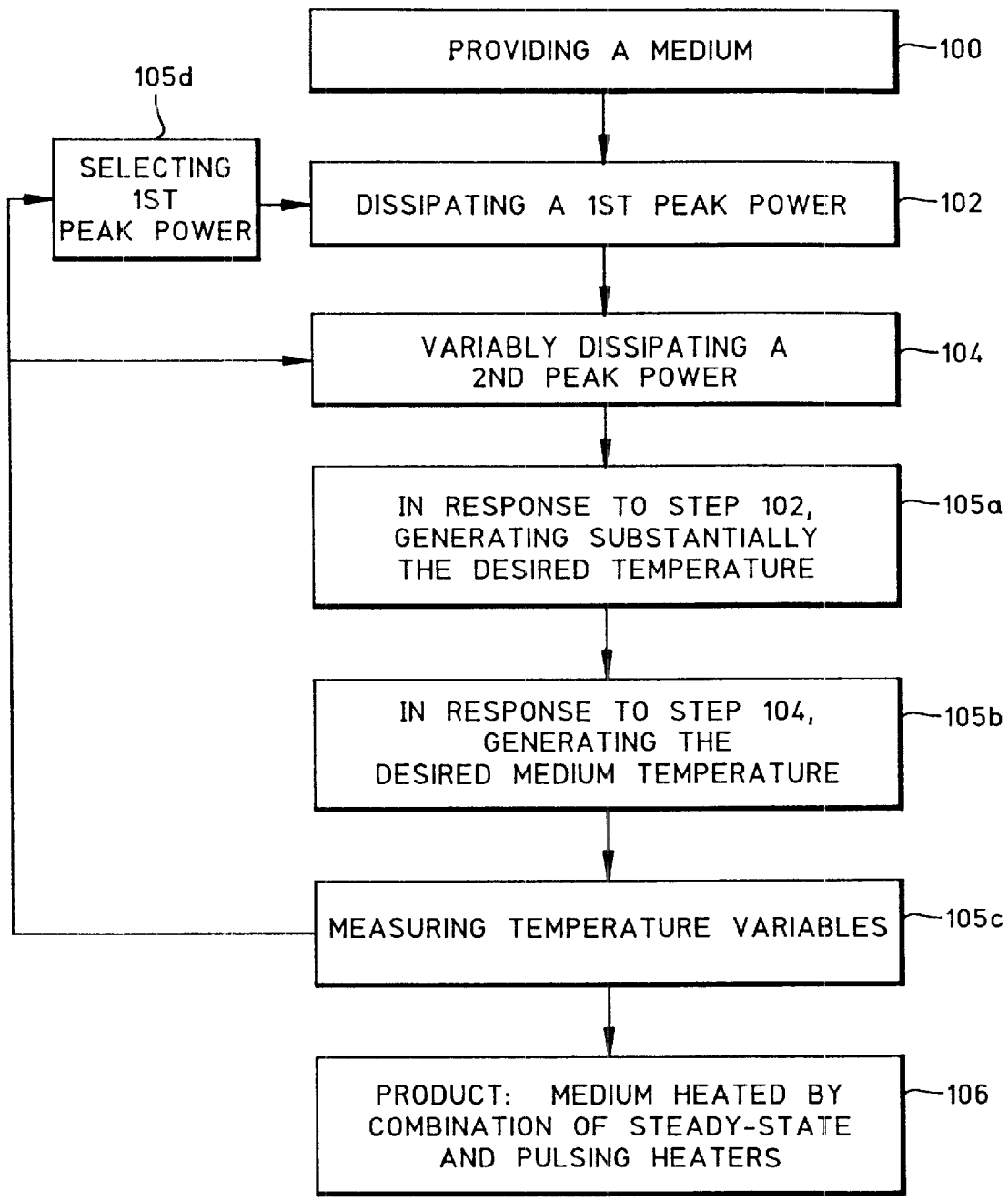
FIG. 8 illustrates a selectable first peak power aspect of the method described by 7.

FIG. 8 illustrates a selectable first peak power aspect of the method described by FIG. 7. Step 102 includes the first peak power level being selectable, and Step 105d selects the first peak power level in response to changes in the desired temperature over time measured in Step 105c.

In some aspects of the invention the first peak power is dynamically selectable. A controller is provided in Step 100, along with a power supply to power the plurality of heating elements. Step 105c, measures the power supply voltage, output medium temperature, the set-point, and the ambient medium temperature. Then, Step 105d includes the controller selecting a first peak power levels in response to the measurement of the power supply voltage, ambient medium temperature, set-point, and output medium temperature measured in Step 105c. The selection of the second peak power in Step 104 automatically follows from the selection of the first peak power. Further, Step 104 includes varying the intermittence of the second peak power level in response to the measurement of the variables in Step 105c.

Figure 9:
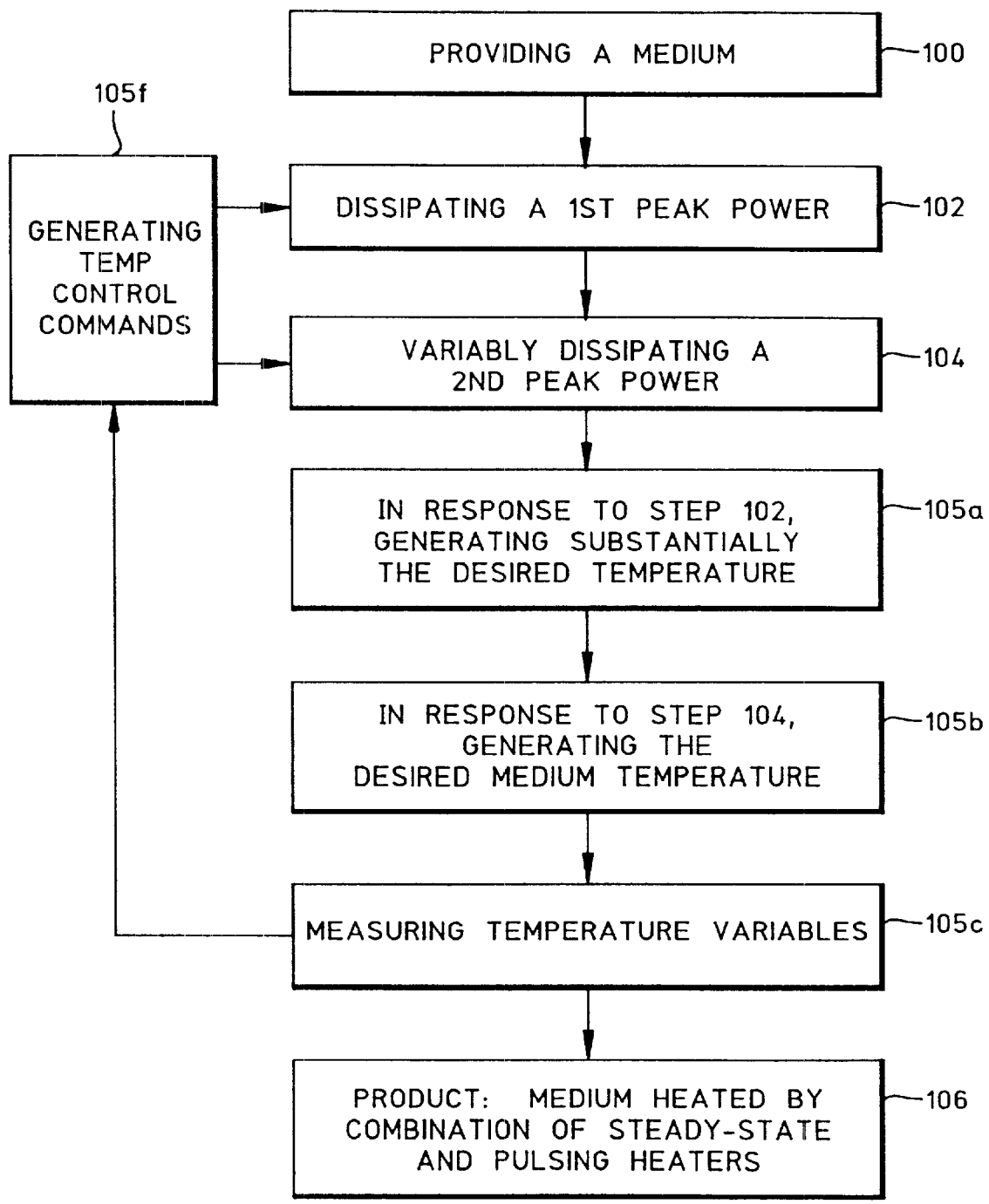
FIG. 9 illustrates a dynamic first and second peak power aspect of the method described by FIG. 8.

FIG. 9 illustrates a dynamic first and second peak power aspect of the method described by FIG. 8. Step 100 provides a plurality of heating elements. Then, Step 102 includes selecting a first combination of heating element from the plurality of heating elements to generate the first peak power, and Step 104 includes selecting a second combination of heating elements from the plurality of heating elements to generate the second peak power. When the second peak power level is 200 watts, or less, it is possible for the first peak power to be zero. That is, the first combination of elements can be the selection of no elements.

Typically, Step 100 provides at least first, second, and third heating elements, although the concept is applicable to more heating elements. The third heating element dissipates a peak power greater than that dissipated by the second heating element, and the second heater dissipates a peak power greater than that dissipated by the first heating element. Step 102 includes generating the first peak power from heating elements selected from the group consisting of the first, second, and third heating elements, or no heating element. Step 104 includes generating the second peak power from heating elements selected from the group consisting the first, second, and third heating elements. As above, Step 104 includes the third peak power being less than approximately 200 watts.

Step 100 provides that the plurality of heating elements are selectively connectable to a power supply voltage. Step 105f selectably connects the plurality of heating elements to the power supply in response to the generation of the temperature control commands by the controller. Step 102 includes selecting from the plurality of heating elements to generate a first peak power level in response to the temperature control commands. Step 104 includes selecting from the plurality of heating elements to generate a second peak power level, and varying the intermittence of the second peak power in response to the temperature control commands.

Since the second peak power level is typically the next largest increment of power available, the selection of the second power level automatically follows from the selection of the first peak power level. Therefore, the selection of the first peak power level, is directly related to the selection of the second peak power. Alternately, the first peak power level could follow from the selection of a second peak power level.

Specifically, in Step 105f a two-part digital word is created, where the first part includes a plurality of bits, with each bit corresponding to a heating element in the plurality of heating elements. The second part of the digital word creates a timing pattern. Then, Step 102 includes selecting heating elements in response to the first part of the digital word. Step 104 includes varying the intermittence of the second peak power level in response to the second part of the digital word. The first peak power is constantly maintained, while the third peak power is intermittently added to the first peak power. However, the actual value of the first peak power level (and therefore the third peak power level) may be dynamically adjusted.

Typically, Step 100 provides that the controller has a plurality of inputs. Step 105c includes providing temperature related variables to the controller including the medium output temperature and the desired temperature set-point. Step 105f generates the temperature control word in response to the temperature related variable using a proportional-integral-derivative (PID) algorithm.

Figure 10:
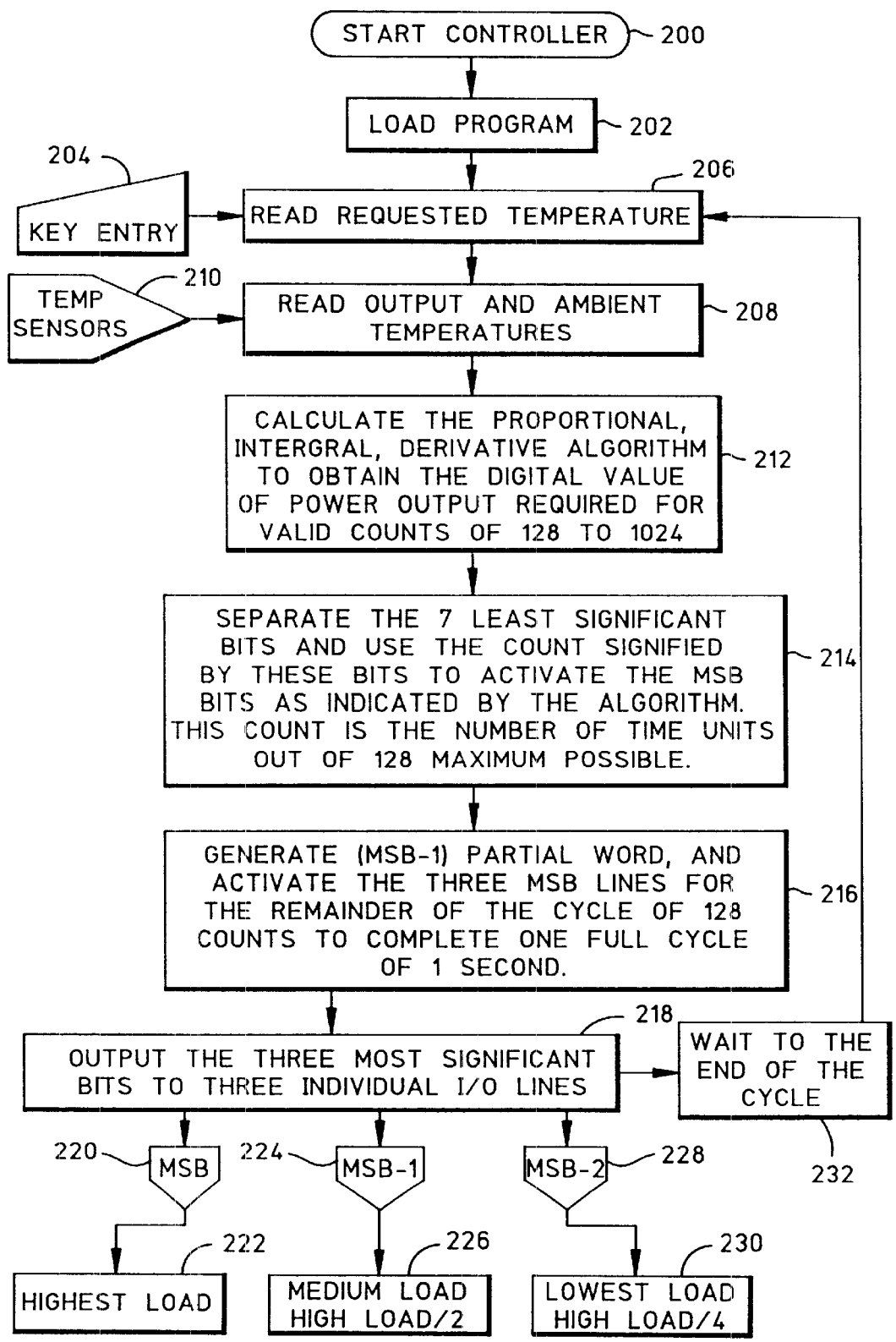
FIG. 10 is a flowchart illustrating a method for controlling a three-element heater with a ten-bit control word.

FIG. 10 is a flowchart illustrating a method for controlling a three-element heater with a ten-bit control word. In Step 200 the controller is started, and a program is loaded in Step 202. A desired medium, or second temperature, is entered in Step 204. In Step 206 the controller reads the set-point temperature entered in Step 204. In Step 208 the output sensor data is read. The sensor data is supplied in Step 210.

In Step 212 the heater elements are selected and the timing of the first and second heaters is calculated. In Step 214, the calculations are converted into a ten-bit control word, with the three most significant bits (first partial word) set for the second power level. Step 216 generates a first partial word to activate the first power level from the plurality of heater elements, with the remainder of the word being used for timing, the proportional "on" time of the second power level with respect to the first power level.

Figure 11:
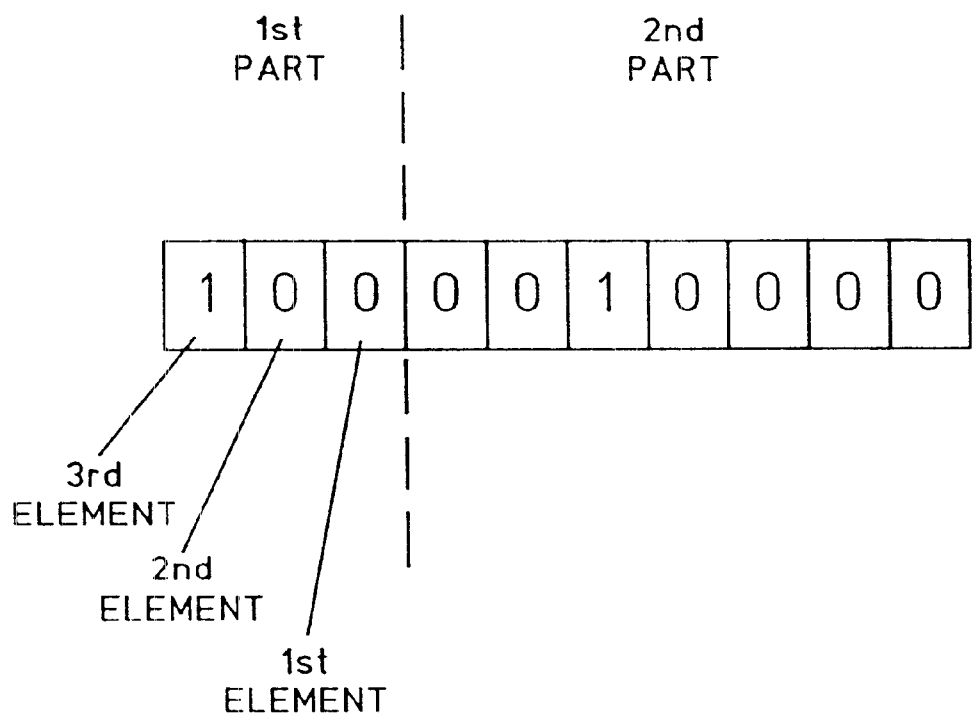
FIG. 11 is a diagram illustrating the ten-bit control word.

FIG. 11 is a diagram illustrating the ten-bit control word. The first part of the digital word includes three bits, where each bit is used to control the activation of a heater section, and so control the peak power dissipated. In the example of FIG. 11, the first part has a value of 4 (100). The "1" bit enables the third heating element. The two zeros disable the first and second heating elements. In the generation of the digital word first part, a first plurality of bits is generated, in this case three, with each bit corresponding to a heating element. One bit is used for each heating element. If four heating sections are used, the first part of the digital control word would be four bits. Alternately, the first part of the word (the heater control bits) may be located in other bit locations inside the 10-bit word, however, alternate locations inside the word may require a separate step of shifting which is avoided in the present scheme.

The peak power time duration is responsive to the digital word second part. To control the heater accurately, timing control is broken down into half power cycles, where one power cycle is $\frac{1}{60}^{th}$ of a second in North America, and $\frac{1}{50}^{th}$ of a second in the rest of the world. For example, in North America there are approximately 120 half cycles per second. The generation of the digital word second part includes a second plurality of bits, in this case seven, the sum of which defines a timing pattern. The seven least significant bits of the second part of the digital word are used to create 128 incremental steps, where 120 of the steps evenly divide a second. In the example shown in FIG. 11, the third heater element is enabled for a count, or time duration of $\frac{16}{128}$, or $\frac{1}{8}^{th}$ of a second (0010000). The first and second heaters are "on" for the rest of the cycle, or $\frac{7}{8}^{th}$ of a second. The first part of the cycle is the second phase including both the first and second heaters (second peak power). Since $\frac{1}{8}^{th}$ of a second is 15 half cycles, from counts 16 to 120 the first heater is enabled (first peak power), which is the next lower increment in power dissipation.

The heater elements are graduated by approximately equal power differences, where each difference is less than 200 watts. The first heater in this example would be the enablement of both the first and second heating elements, while the third heating element is disabled. That is, a first word part becomes (011) in the first heater phase of the heating cycle. Alternately stated, the selection of a peak power dissipation includes varying the power between a first and second peak power, and the selection of a peak power time duration includes selecting a first duration for the first peak power and a second duration for the second peak power. The difference between the first and second peak power levels is less than 200 watts.

The medium temperature to be controlled is sensed by a suitable sensor in Step 210, and after amplification, is fed into an Analog to Digital converter. The digital value of this temperature is processed through any control scheme including any PID control scheme or even just a proportional scheme. An output word is generated which is indicative of the level of required power.

Typically, each heater section dissipates twice the peak power of the next lower heater section. The corresponding power value of these heaters is represented in binary format. If the third position from left has a value of "x Watts ", the second position has the value "2x Watts", and the first position has a value "4x Watts". The right 7 positions provide the digital value of duty cycle, which are explained in more detail, below.

Assuming the unit is started cold, the digital word will be:

111 (1111111) second heater phase where the bold number represents the first part of the digital word, and the number in parenthesis represents the second part of the word. All three heaters are on with the duty cycle of 128 out of 128. The first heater phase is "0" duty cycles. The selection of the first (or second) peak power includes engaging each heating element in response to the corresponding bit in the digital word first part. Up to this point in discussion, the present invention has been presented as a constant dissipation of a first peak power and the intermittent dissipation of a second, greater, peak power. However, as presented in the example of FIG. 10, the invention can also be embodied as a dissipation of a second peak power with intermittent reductions in power to a first peak power level.

As the heater warms up, less power is required, and the duty cycle is decreased.

111 (1110111) second heater phase

All heaters are on for $^{119}/_{128}{}^{th}$ of a second and:

110 first heater phase the smallest heater is off for $^{9}/_{128}{}^{th}$ of a second.

The first three bits of the control word are the heater control bits, which exit the controller on individual I/O lines to control separate heaters. The rest of the control word, the right 7 bits are retained internally to indicate the duty cycle (the timing of the left three bits).

As the warming continues:

111 (0000001) second heater phase

All heaters are on for $^{1}/_{128}{}^{th}$ of a second and:

110 first heater phase the smallest heater is off for $^{127}/_{128}{}^{th}$ seconds.

In the next step of reduction:

111 (0000000) second heater phase

The smallest heater is always off. There is no second half to this cycle.

In the following steps different heater combinations are used. Both portions of each cycle are now shown on the same line. As warming continues:

110 (1111111) second heater phase

Meaning power level 6 is always on. As warming continues:

| SECOND | FIRST |
|---|---|
| 110 (0000001) $^{1}/_{128}{}^{th}$ sec. | 101 $^{127}/_{128}{}^{th}$ sec. |
| 101 (1111111) | |

Meaning bits 4 and 1 are on continuously. The number indicated in the parentheses corresponds to the portion of time the higher power setting is on. 128 minus this number corresponds to the time the lower power setting is on. (0000000) defines a condition where no portion of the higher power level (the power indicated in front of the parentheses) is on. Therefore, the lower power is on all the time (for a full second).

To continue the example further:

| SECOND | FIRST |
|---|---|
| 101 (1111000) $^{120}/_{128}{}^{th}$ sec. | 100 $^{8}/_{128}{}^{th}$ sec. |
| 101 (1110111) $^{119}/_{128}{}^{th}$ sec. | 100 $^{9}/_{128}{}^{th}$ sec. |
| 101 (1110110) $^{118}/_{128}{}^{th}$ sec. | 100 $^{10}/_{128}{}^{th}$ sec. |
| 101 (0000001) $^{1}/_{128}{}^{th}$ sec. | 100 $^{127}/_{128}{}^{th}$ sec. |
| 101 (0000000) none | 100 continuous |
| 100 (1110111) $^{119}/_{128}{}^{th}$ sec. | 011 $^{9}/_{128}{}^{th}$ sec. |

The 10 bits act as one contiguous word internal to the microprocessor and in all calculations. The first three bits are separated at the output to directly run the heaters, after some buffer/isolation amplifiers, see control lines 52, 54, and 55 of FIG. 4.

Returning to FIG. 10, Step 218 outputs the three most significant bits (first word part) to enable the heating elements. As explained above in the description of FIG. 11, Step 220 checks the most significant bit and Step 222 enables the third heating element if the bit is a "one". Likewise, Step 224 checks the second most significant bit and Step 226 enables the second heating element if the bit is a "one". Step 228 checks the third most significant bit and Step 230 enables the first heating element if the bit is a "one". Step 232 checks the timing associated with the second word, and returns to Step 206 for the generation of a new control word.

Figure 12:
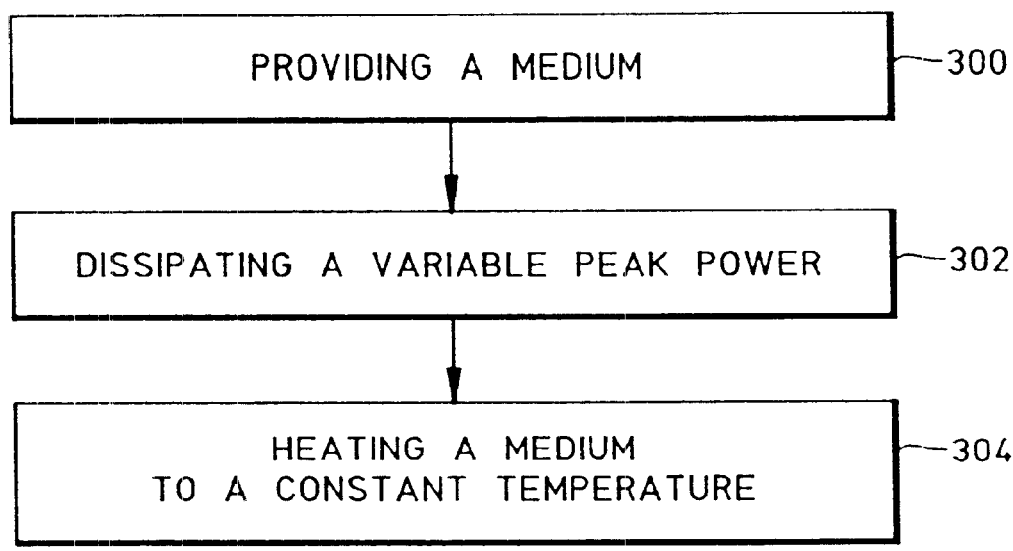
FIG. 12 is a flowchart illustrating an alternate aspect of the method of the present invention for minimizing fluctuations in power consumption.

FIG. 12 is a flowchart illustrating an alternate aspect of the method of the present invention for minimizing fluctuations in power consumption. Step 300 provides a medium. Step 302 dissipates a variable peak power into a medium at a first duty cycle. Step 304, in response to Step 302, is the product of a medium heated to a constant temperature.

Step 302 includes alternately dissipating a first peak power, and a second peak power, greater than the first peak power. Step 302 includes varying the first duty cycle, while Step 304 includes maintaining the constant output temperature in response to varying the first duty cycle. Step 302 includes the difference between the first and second peak powers being less than 200 watts.

A method of minimizing power fluctuations in the loading of a high-wattage power device have been provided above. The embodiments include a heater made from first heater and a pulsed second heater elements. Variations of the invention include a multitapped first heater. A multistage heater where the first and second heaters are selected from a plurality of possible heating elements, provides the most flexibility. Other variations and embodiments of the present invention will occur to those skilled in the art.

What is claimed is:

1. A heater, comprising:

a plurality of heater elements; and a controller with an output for providing control commands that selectively activate heater elements of the plurality of heater elements;

the control commands including a temperature control command with at least two parts, a first part having a first number of bits corresponding to the plurality of heater elements, and a second part with a second number of bits corresponding to a duty cycle;

the first number of bits for enabling heater elements of the plurality of heater elements during a duty cycle; and the second number of bits establishing one phase of the duty cycle during which all of the enabled heater elements are on and another phase of the duty cycle during which one of the enabled heater elements is off.

2. The heater of claim 1, wherein the plurality of heater elements have power capacities, with the power capacities graduated by a constant factor.

3. The heater of claim 2, wherein the one of the enabled heater elements has the least power capacity of the enabled heater elements.

4. The heater of claim 3, wherein the one phase of the duty cycle is a first phase and the other phase of the duty cycle is a second phase which follows the first phase.

5. The heater of claim 3, wherein the one phase of the duty cycle is a second phase and the other phase of the duty cycle is a first phase which precedes the second phase.

* * * * *